United States Patent Office 3,508,121
Patented Apr. 21, 1970

3,508,121
ALTERNATING CURRENT ELECTROMAGNETIC APPARATUS
Tsuneo Kobayashi, Hirakata-shi, and Koichi Yoshimura, Kadoma-shi, Japan, assignors to Matsushita Electric Industrial Co., Ltd., Osaka, Japan
Filed Aug. 12, 1966, Ser. No. 572,034
Claims priority, application Japan, Oct. 13, 1965, 40/83,943 (utility model)
Int. Cl. H01h 47/00; H01f 7/14
U.S. Cl. 317—155.5         15 Claims

ABSTRACT OF THE DISCLOSURE

An electromagnetic apparatus comprising a high voltage exciting winding to be connected to an AC power source, a low voltage control winding not connected to any power source, a stationary iron core on which the two windings are wound, and a movable iron core disposed opposite the stationary iron core. The exciting winding and control winding are wound on a single bobbin whereby the movable iron core will be actuated under the control of said low voltage control winding.

---

The present invention relates to an alternating current electromagnetic apparatus for the remote controlling of a high voltage primary circuit by a low voltage secondary circuit.

An electric apparatus, applied to an electric cleaner, comprising a low voltage relay combined with a transformer has been disclosed in U.S. Patent No. 2,958,894.

Also a transformer-relay which is a combination of a transformer and a relay, wherein a magnetic pole is formed by rolling a part of the transformer and a movable iron core is provided to face the magnetic pole, has been disclosed in U.S. Patent No. 2,509,835 and No. 2,527,220.

U.S. Patent No. 2,958,894 teaches a transformer-relay which is a combination of a transformer and a relay, whereby a mere technical idea concerning low voltage controlling is applied to an electric cleaner. This transformer-relay has many defects in that it is large in its overall size, difficult to construct and to execute wiring, needs many parts such as iron cores and coils and is troublesome to manufacture and in maintenance. Such defects as described above introduce problems especially in associating with electrified products such as electric cleaners and in maintenance thereof.

U.S. Patent No. 2,509,835 and No. 2,527,220 disclose further improved apparatuses of this character. In each of the patents, an exciting coil and controlling coil are provided separately, and both of them have defects in that they are large in size, are of lower efficiency and are troublesome to manufacture.

The present invention is intended for the elimination of the above described defects, and relates to improvements of low voltage controlling alternating current electromagnetic apparatus to be used in domestic electric apparatuses such as electric cleaners, ventilating fans, fans, radio receivers, television receivers, or in distribution apparatuses such as safety switches, relay chimes, transformer buzzers and central controllers for wirings, or in automatic controlling apparatuses such as water level controllers, temperature controllers, photo controllers and moisture controllers.

The object of this invention is to provide an alternating current electromagnetic apparatus comprising an exciting coil connected to an alternating current power source, a stationary iron core wound thereon with said exciting coil to constitute a magnetic circuit, a movable iron core arranged to face said stationary magnetic core to constitute a part of said magnetic circuit, a controlling coil wound in the neighbourhood of said exciting coil and electrically insulated from said exciting coil and a spring to normally detach said movable iron core from said stationary iron core (field iron core), to thereby control operation of said movable iron core by variation of impedance value of said controlling coil.

The main object of this invention is to provide an alternating current electromagnetic apparatus for use in above described apparatuses, having a good power transmission effect and a good controlling effect, by winding both an exciting coil and a controlling coil concentratedly, and in the neighbourhood of each other, around a part of a stationary iron core which constitutes a magnetic circuit.

Another object of this invention is to provide a convenient and reasonable alternating current electromagnetic apparatus by winding both an exciting coil and a controlling coil in an up-and-down relation in neighbourhood of each other, or in a stratiform winding to form an outer layer and an inner layer separated from each other, or in a bifilar winding, in each case both of said coils being wound on a single bobbin for winding said both coils concentratedly around a part of a stationary iron core constituting a magnetic circuit.

Still another object of this invention is to minimize the size and lower the cost of an alternating current electromagnetic apparatus by making a bobbin in a single unit for winding both an exciting coil and a controlling coil concentratedly around a part of a stationary coil constituting a magnetic circuit.

Still another object of this invention is to provide an alternating current electromagnetic apparatus which automatically operates in a stable manner in response to the variation of circumstance wherein the present apparatus is set by inserting in the controlling circuit thereof a controlling element such as a thermosensitive resistance, for example, a thermister or a posister, or such as a photosensitive resistance, for example, CdS or PbS.

A still further object of this invention is to provide an alternating current electromagnetic apparatus having a wide range operating voltage by the inclusion of a controlling element such as a condenser or an inductance, etc.

A still further object of this invention is to provide an alternating current electromagnetic apparatus in which both an exciting coil and a controlling coil are concentratedly wound at a portion of a stationary iron core constituting a magnetic circuit, characterizing by making the maximum controlling voltage lower than 30 volts when controlling the operation of a movable iron core in accordance with the variation of the impedance of the controlling coil.

Still another object of this invention is to provide a safety relay of small size and of light weight in which a contactor mechanism is driven by movable iron core to perform the switching of contacts.

Other objects and advantages of this invention will be clearly understood by the following detailed explanation of the embodiments of this invention with reference to the drawings.

Hereinafter, detailed explanation will be made on the embodiments shown in the annexed drawings, in which.

Figure 1:
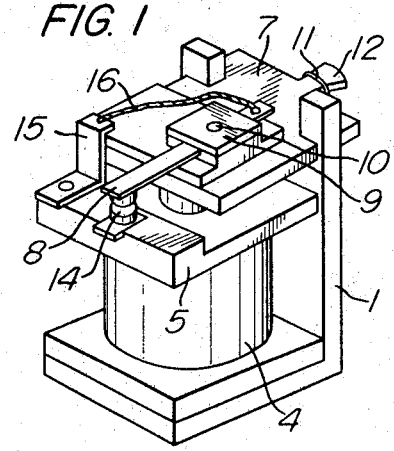
FIG. 1 is an oblique view of an alternating current electromagnetic apparatus embodying the present invention.
Figure 2:
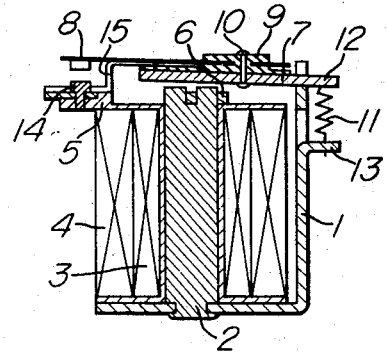
FIG. 2 is a longitudinal sectional view of FIG. 1.

Referring to FIGS. 1 and 2, reference numeral 1 denotes an L-shaped fixed frame in which a recess is formed at the middle portion of the upper end portion of a side plate; reference numeral 2 denotes a stationary iron core provided with a bobbin 5, on which an exciting coil 3 and a controlling coil 4 are wound in a stratiform, and fixed to said fixed frame, reference numeral denotes a shading coil mounted on the upper end of said iron core 2; reference numeral 7 denotes a movable iron core inserted movably in the recess formed at the upper end of the side plate of the fixed frame 1; reference numeral 8 denotes a movable contactor plate fixed to the movable iron core 7 by a fixing pin 10 with an intervening insulating plate 9 therebetween to insulate the contactor plate 8 from the iron core 7; reference numeral 11 is a spring secured between a projection 12 at the rear end of the movable iron core 7 and a bent portion 13 of the fixed frame 1 to bias the forward end of the movable iron core 7 upwardly; reference numeral 14 denotes a stationary contact secured on the bobbin 5 at the place facing the contact on the forward end of the movable contactor plate 8; reference numeral 15 denotes a stopper for the movable iron core 7 mounted on the end of the bobbin 5; and reference numeral 16 denotes a flexible wire connecting one end of the movable contactor plate to the stopper 15.

Further, the extended portion of the insulating plate 9 is mounted on the surface of the movable iron core 7 where the stopper 15 is in contact with the movable iron core 7.

Further, concrete explanation of an example of the construction will be made hereinafter.

Both the fixed frame 1 and the movable iron core 7 are made of a cold rolled steel plate (JIS SPC3), and the stationary iron core 2 is made of a pure iron, class 2 (JIS SUYB). The exciting coil 3 is formed by winding 6,800 turns of a copper wire of 0.04 mm. diameter coated with polyurethane and the controlling coil 4 is formed by winding 2,500 turns of a copper wire of 0.06 mm. diameter coated with polyurethane. This example is in a case where the exciting coil 3 is wound on the inner side, while the controlling coil 4 is wound on the outer side in a stratiform.

Both the bobbin 5 and the insulating plate 9 are formed of a thermoplastic resin, such as phenol resin, and the contactor plate is made of bronze (JIS PbP2), and the spring is made of piano wire.

The apparatus is constructed to have the overall size of 49 mm. x 29 mm. x 40.5 mm., and the overall weight of 100 g., the contacting pressure being 30 g., the exciting voltage being 100 v., the controlling voltage being 18 v. (when the circuit is opened), the operating voltage being 70 to 130 v., the frequency being 50 to 60 cycles per second.

It is desired that the controlling voltage be as low as possible; however, the limit thereof is set by the following Tables 1 and 2.

TABLE 1

| Current flowing through human body (ma.) | Condition of human body |
|---|---|
| Approximately 1 | Experiences smarting. |
| Approximately 5 | Feels a little pain. |
| Approximately 10 | Feels a severe pain untolerable. |
| Approximately 20 | Muscles become numb, and cannot move. |
| Approximately 50 | Dangerous to a remarkable degree, and can cause death. |
| Approximately 100 | In many cases caused death. |

TABLE 2

| Condition | Value of resistance ($\Omega$) |
|---|---|
| Resistance of inside of human body | Approximately 500. |
| Skin surface of dry hand | Approximately 3,000. |
| Skin surface of wet hand | Approximately 500. |
| When touched by a dry finger | Approximately $2 \times 10^4$. |

According to Table 1 since the resultant resistance of the human body, when subjected to an electric shock, is approximately of the degree of 1500$\Omega$, it is neecssary to set the maximum controlling voltage at 20 ma. x 1500$\Omega$= 30 v. for maintaining the value of current to be less than 20 ma. (so as not to cause death).

It is a well known idea to depress the voltage to low value. However, the present invention is significant in that the controlling voltage of an A.C. electromagnetic apparatus is set at a value lower than 30 v. and a low voltage control is obtained by using the apparatus of the present invention.

An outline of the operation of the A.C. electromagnetic apparatus of this invention is as follows. When a current flows through the exciting coil 3, a magnetic flux is generated passing through the stationary iron core 2—the fixed frame 1—the movable iron core 7—the air gap—the stationary iron core 2, thereby the movable iron core 7 is attracted by the stationary iron core 2. Accordingly, the contact mounted on the movable contactor plate 8 which is secured to the movable iron core with the intervening insulating plate 9 therebetween, is brought into contact with the stationary contact 14 mounted on the end of the bobbin 5, thus a current flows through the electromagnetic apparatus.

In this state, when the controlling coil is short-circuited across both of its terminals, a short-circuiting current flows through the controlling coil owing to an induced voltage by the current through the exciting coil, resulting in a reduction of the amount of the magnetic flux through the movable iron core, and, accordingly, the movable iron core is repulsed from the stationary iron core 2. Then the movable contactor plate 8 moves away from the stationary contact 14.

Figure 3:
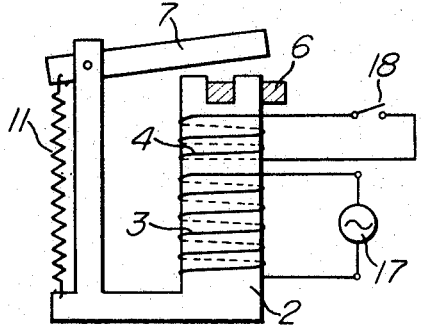
FIG. 3 is a diagram illustrating the principle of the A.C. electromagnetic apparatus shown in FIG. 1.
Figure 4:
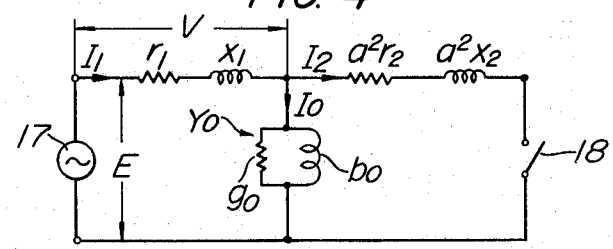
FIG. 4 is a connection diagram of an equivalent circuit of the diagram of FIG. 3.

As described above, the controlling coil 4 controls the exciting coil 3 directly. For the purpose of a further detailed explanation of the above operation, the principle of the apparatus is shown in FIG. 3 and the equivalent circuit thereof is shown in FIG. 4. In FIG. 4, symbol $r_1$ denotes the value of resistance of the exciting coil 3; symbol $X_1$ denotes the value of impedance of the exciting coil 3; $a^2 r_2$ denotes the value of resistance of the controlling coil 4, $a^2 x_2$ denotes the value of reactance of the controlling coil 4; symbol $a$ denotes the ratio of the number of turns of the exciting coil 3 and the controlling coil 4; symbol $Y_0$ denotes the value of exciting admittance; symbol $g_0$ denotes the value of exciting conductance; and symbol $b_0$ denotes the value of exciting susceptance. Since this circuit is similar to an equivalent circuit of a transformer, this circuit may be easily understood.

In this equivalent circuit, a current $I_2$ flows or does not flow through the controlling coil depending on whether the switch 18 is opened or closed. Thus the voltage drop by the impedance $(Z_1=\sqrt{r_1^2+X_1^2})$ varies according to the switching of the switch 18, and on the other hand, the voltage E of the A.C. power source is substantially constant independent of the switching of the switch 18 and therefore the voltage across the exciting admittance $Y_o$ varies according to the switching of the switch, and as a result, the magnetic flux is varied.

Thus the technical idea of this invention lies in that the main magnetic flux is made to vary in accordance with switching operation of the secondary coil, contrary to the common notion that the magnetic flux in a transformer is constant despite the switching of the secondary coil.

For the purpose of increasing the controlling effect by the movable iron core 7, it is confirmed by experiments that the number of turns of the controlling coils 4 should be made as nearly equal as possible to the number of turns of the exciting coil 3. As a result of experiments, the operating voltages are as follows. The voltage (the voltage of lower limit) necessary to attract the movable iron core upon switch-off of the controlling coil is 65 v. both when the number of turns of the controlling coil is made nearly equal to the number of turns of the exciting coil, and when the number of turns of the controlling coil is different from that of the exciting coil. However, the voltage (the voltage of upper limit) necessary to attract the movable iron core upon switch-on of the controlling coil is 160 v. when the number of turns of the controlling coil is nearly equal to the number of turns of the exciting coil, and is 100 v. when the number of turns of the controlling coil is different from that of the exciting coil; thus the controlling effect differs remarkably dependent on the number of turns of the controlling coil compared with that of the exciting coil.

Figure 5:
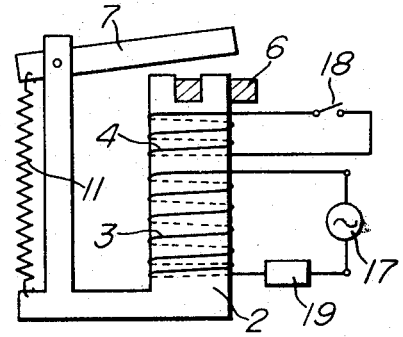
FIG. 5 is a diagram illustrating principle of the A.C. electromagnetic apparatus shown in FIG. 3 wherein the exciting coil is provided with a controlling element, such as a resistance, a condenser or an inductance.

In FIG. 5, a controlling element 19, such as a resistor, condenser or inductor, is inserted between the power source 17 and the exciting coil 3 in the A.C. electromagnetic apparatus shown in FIG. 3.

Explanation will be made hereinafter concerning the case wherein a resistor is inserted as the controlling element 19.

The number of turns of the controlling coil can be made to be nearly equal to that of the exciting coil while at the same time depresisng the voltage of the exciting coil to a degree of lower than 20 v. As the result, the controlling effect for the movable iron core 7 by the switching of the controlling coil 4 is improved.

Namely, in case a resistor is connected in series with the exciting coil 3, the distribution becomes such that more than 80 v. of the voltage can be applied across the resistor, and accordingly the voltage across the controlling coil can be set at a voltage lower than 20 v., even if the number of turns of the controlling coil is equal to the number of turns of the exciting coil.

The additional effect of inserting a resistor in series with the exciting coil 3 is that the impedance value, which does not contribute to the generation of the magnetic flux, is increased, whereby the controlling effect is improved owing to the nature of the electromagnetic apparatus of this character.

In case a condenser is inserted in series with the exciting coil 3, the variation of the amount of magnetic flux upon the switching of the controlling coil 4 is caused by the variation of the reactance value of the exciting coil 3 seen from the power source side, and the improvement with controlling effect is considered to be caused owing to the magnification in the variation of the reactance value by the insertion of a condenser.

In case an inductor is used as the controlling element 19, it is considered that the variation of the reactance value is magnified by the insertion of an inductor.

Figure 6:
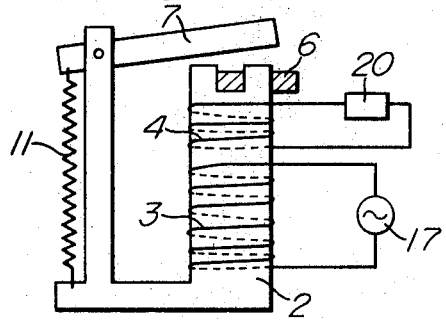
FIG. 6 is a diagram illustrating principle of the A.C. electromagnetic apparatus shown in FIG. 1, wherein the controlling coil is connected to a controlling element such as a switch, a rectifier, a photosensitive resistance or a thermosensitive resistance.

In FIG. 6, the controlling coil 4 of the A.C. electromagnetic apparatus shown in FIG. 3 is short-circuited by a controlling element 20 such as a rectifier, photosensitive resistance or thermosensitive resistance.

In case a rectifier is to be connected, a switch is connected in series with the rectifier, or a controlled rectifier such as SCR is used.

In case a photosensitive resistance or thermosensitive resistance is used as the controlling element 20, such element is used as the switch 18 shown in FIG. 3. Such an apparatus is expected to have, in the future, various applications as a controlling means for an apparatus using photosensitive resistance or thermosensitive resistance as a switch.

In the A.C. electromagnetic apparatus shown in FIG. 1 and explained above, the exciting coil 3 and the controlling coil 4 are illustrated to be wound concentratedly in a stratiform. However, the exciting coil 3 and the controlling coil 4 may be wound in the form of bifilar winding, and then the degree of coupling of the two coils becomes better and the controlling efficiency can be improved.

Next, the explanation will be made on another embodiment of the invention in which the exciting coil 3 and the controlling coil 4 are wound vertically, namely, in an up and down relation in the neighborhood of each other.

Figure 7:
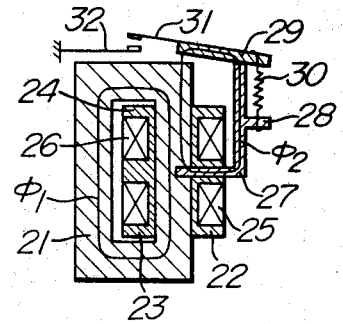
FIG. 7 is a longitudinal sectional view of a controlling coil and an exciting coil of another embodiment of this invention, each vertically wound on the upper part and the lower part of a frame respectively.

In FIG. 7, reference numeral 21 denotes a ring-shaped exciting coil and reference numeral 22 denotes a bobbin formed of a synthetic resin material comprising a portion 23 for an exciting coil and a portion 24 for a controlling coil. An exciting coil 25 and a controlling coil 26 are wound around the portions 23 and 24 respectively. The number of turns of the controlling coil 26 is less than that of the exciting coil 25 and the controlling coil 26 is normally opened. Reference numeral 27 denotes an L-shaped exciting iron core secured to the ring-shaped exciting iron core 21 having a projection 28 formed at a part thereof. Reference numeral 29 denotes a movable iron core mounted to the projection 28 through a resetting spring 30 and is provided with a movable contact 31 at the end thereof. Reference numeral 32 denotes a stationary contact arranged to face the contact 31.

Next, the operation of the apparatus will be explained, wherein the exciting coil 23 and the controlling coil 24 are wound in an up-and down-relation to each other and in the neighborhood of each other.

When an A.C. source voltage is applied to the exciting coil 25, a primary magnetic flux $\phi_1$ is generated in the exciting iron core 21 by the excitation of the coil 25.

As the primary magnetic flux $\phi_1$ interlinks with the controlling coil 26, a voltage much lower than the voltage applied to the exciting coil 25 (lower than 30 v., preferably lower than 20 v.) is induced in the controlling coil 26. When the controlling coil 26 is short-circuited, a short-circuit current flowing through the controlling coil 26 generates a secondary magnetic flux $\phi_2$, and causes the exciting iron core 27 to attract the movable iron core 29 against the force of the resetting spring 30. Then the movable contact 31 contacts with the stationary contact 32, and thus the relay comprising the contacts 31 and 32 is closed.

On the contrary, when the controlling coil 26 is opened, the secondary magnetic flux is extinguished, and the movable iron core 29 moves away from the controlling iron core 27, and the relay is opened.

Thus, the A.C. electromagnetic apparatus of this embodiment is provided with the exciting coil 25 and the controlling coil 26 wound coaxially in an up-and-down relation around the bobbin 22, and has the exciting iron core 27 provided between the exciting coil 25 and the controlling coil 26, and is further provided with the movable iron core 29 to constitute a secondary magnetic circuit, wherein the bobbin 22 can be formed in a single unit. Also, since the apparatus is so constructed that the primary magnetic flux by the exciting coil 25 does not pass through the secondary magnetic circuit, it can eliminate the effect of the primary magnetic flux, which causes the operation of the movable iron core 29 to be unstable, or causes the range of the operating voltage to be narrow, or decreases the transmission efficiency of power from the exciting coil 25 to the controlling coil 26.

In case a rectifier is connected in a device shown in FIG. 7 an alternating magnetic flux $\phi$ is generated by the exciting coil 3 connected to the power source 17. An induced electromotive force is induced in the controlling coil 4 by the magnetic flux $\phi_1$. Since the rectifier is connected to the controlling coil 4, a D.C. magnetic flux $\phi D$ is generated upon closing of a switch connected in series with the rectifier. By the D.C. magnetic flux $\phi D$ passing through the stationary iron core 2 and movable iron core 7, the movable iron core 7 is attracted to contact with the stationary iron core 2. The movable iron core 7 moves away from the stationary iron core 2 when the magnetic flux is extinguished upon opening of the switch. Thus owing to the effect of the D.C. magnetic flux which flattens the A.C. magnetic flux, the vibration of the movable iron core is suppressed, resulting in a reduction of noise and electrical and mechanical losses, and also elimination of a shading coil.

An apparatus using a shaded magnetic pole will be explained as still another embodiment of this invention.

Figure 8:
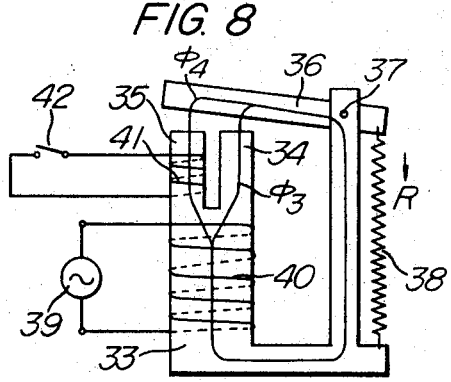
FIG. 8 is a diagram illustrating the principle of still another embodiment of the invention wherein a shading coil is used as a controlling coil.
Figure 9A:
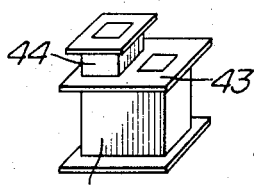
FIGS. 9a and 9b are oblique views of the A.C. electromagnetic apparatus shown in FIG. 8.
Figure 9B:
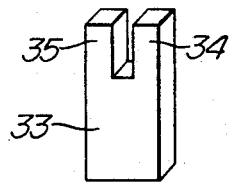

In FIG. 8, reference numeral 33 denotes a U-shaped exciting iron core, on one end portion thereof a non-shaded magnetic pole 34 and a shaded magnetic pole 35 are formed. A movable iron core 36 is rotatably pivoted by an supporting axis 37 to face both of the magnetic poles 34 and 35. The movable iron core 36 is energized by a resetting spring 38 in the direction shown by an arrow R. An exciting coil 40, connected to an A.C. power source 39, is wound around the exciting iron core 33, and a shading coil 41, having a switch 42 connected in series therewith, is wound around the shaded pole 35. The concrete construction thereof is shown in FIG. 9. The exciting iron core 33 shown in FIG. 9b is inserted in a bobbin 43 as shown in FIG. 9a, which comprises a shading coil portion 44 and an exciting coil portion 45, both of the portions 44 and 45 being formed in a single unit.

Now the operation of this apparatus will be explained hereinafter.

In the state where the switch 42 is opened, a flux $\phi_3$ passing through the non-shaded magnetic pole 34 and a flux $\phi_4$ passing through the shaded magnetic pole 35 are in the same phase. In the state where the switch 42 is closed, the flux $\phi_4$ passing through the shaded magnetic pole 35 lags in phase by an electric angle of from 15° to 60°. Thus by short-circuiting and opening the shading coil 41, the flux passing through the movable iron core 36 varies between being in one phase or being in two phases, according to the short-circuiting and opening of the shading coil, and thus the movable iron core 36 can be attracted by the exciting iron core 33 or can be vibrated or can be brought to a standstill.

Since the induced voltage in the shading coil 41 is of a value of several volts, which is below the voltage value which is dangerous for the human body, the safety of the operating circuit for the human body or an animal is improved. Further, since a demagnetizing effect is exerted by short-circuiting the shading coil 41, the residual magnetism in the exciting iron core is reduced, therefore the apparatus can generate a sound with extremely slight deformation. Thus the apparatus may be made into a vibratory apparatus such as a buzzer, a bell or an electric kneader.

Figure 10:
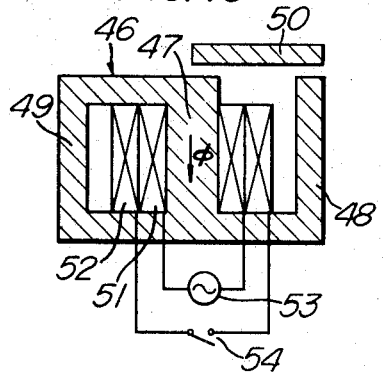
FIG. 10 is a sectional view of still another embodiment of the A.C. electromagnetic apparatus of this invention.

Still another embodiment of the invention will be explained hereinafter. As shown in FIG. 10, an exciting iron core 46 comprises a common iron core portion 47, an open iron core portion 48 and a closed iron core portion 49. A movable iron core 50 is provided to face the open iron core portion 48, and an exciting coil 51 and a controlling coil 52 are wound around the common iron core portion 47 in a stratiform, wherein the exciting coil 51 being wound at the innerside, and the controlling coil 52 being wound at the outerside. The exciting coil 51 is connected to an A.C. power source, and a switch 54 is connected in series with the controlling coil 52.

Figure 11:
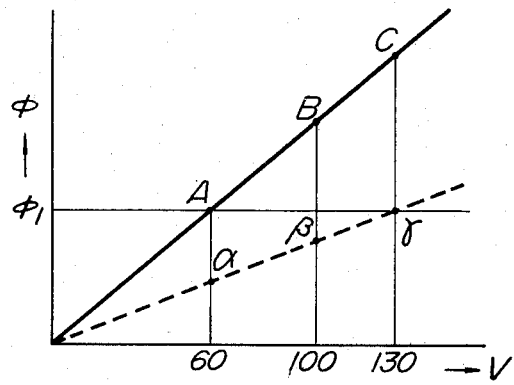
FIG. 11 is a characteristic curve showing the relation between magnetic flux and exciting voltage to illustrate the operation of the A.C. electromagnetic apparatus shown in FIG. 10.

The relation between exciting voltages and magnetic flux $\phi$, in the state where the switch 54 is opened, is shown by the solid line in FIG. 11, wherein the flux $\phi$ varies from the point A to the point B and further to the point C according to the variation of the exciting voltage from 60 to 100 v. and further to 130 v. In the state where the switch 54 is closed, the flux $\phi$ varies from the point $\alpha$ to the point $\beta$ and further to the point $\gamma$ according to the variation of the exciting voltage from 60 to 100 v. and further to 130 v.

Thus, by closing the switch 54, the amount of flux decreases on the whole, because a secondary current $I_2$ flows through the controlling coil 52 upon short-circuiting of the controlling coil 52, which increases the impedance drop in the exciting circuit and lowers the voltage applied across the exciting admittance $Y_0$.

Thus the A.C. electromagnetic apparatus is characterized in that the exciting iron core 46 is provided with the closed iron core portion 49 to form a bias for the magnetic flux, and has an advantage that the exciting current is reduced by the provision of the bias for the magnetic flux.

The A.C. electromagnetic apparatus of the present invention as described above is considered to have various applications. The main object is to have a safety controlling in use, and it is effective especially when used in the place where there exists a danger of an insulation being destroyed, or where a long distribution wire is necessary for a remote control, or where an automatic controlling operation is performed in combination with small power elements, or where a number of distribution wires are arranged in multiplicity.

It is applicable, for example, in electrified products such as electric cleaners, ventilating fans, fans, electric washers, remote controlling apparatuses for radio receivers and electric cookers, and in apparatuses for electric power distribution such as safety switches, relay chimes, transformer buzzers, transformer chimes and transformer bells, and in controlling apparatuses such as water level controlling apparatuses, temperature controlling apparatuses and photo controlling apparatuses.

What is claimed is:

1. An alternating current electromagnetic apparatus comprising a U-shaped stationary iron core, a movable iron core facing the open end faces of said stationary core to constitute a closed magnetic circuit together with said stationary core, spring means urging one end of said movable core away from the opposing end face of said stationary core, an exciting coil and a controlling coil densely wound on one leg of said stationary core in mutually close but insulated relationship, said exciting coil being adapted to be energized from an alternating current source so that said movable core is normally attracted toward said stationary core, and an impedance element connected across said controlling coil, the impedance of said impedance element varying according to the force applied thereto, the electric current induced in said controlling winding by the magnet flux in said stationary core increasing when said impedance decreases to thereby cause said magnetic flux to decrease so that said movable core is moved away from said stationary core.

2. An alternating current electromagnetic apparatus according to claim 1, wherein the number of turns of said controlling coil is set so as to make the maximum controlling voltage of said controlling coil lower than 30 volts in relation to the number of turns of said exciting coil.

3. An alternating current electromagnetic apparatus according to claim 1, comprising a load contact mechanism driven by said movable iron core.

4. An alternating current electromagnetic apparatus according to claim 1, wherein a closed iron core portion is formed in said stationary iron core wound with said exciting coil and said controlling coil to provide a bias for magnetic flux.

5. An alternating current electromagnetic apparatus according to claim 1, wherein said controlling coil is wound in stratiform with, and insulated against said exciting coil.

6. An alternating current electromagnetic apparatus according to claim 1, wherein said controlling winding and said exciting coil are wound in a bifilar winding and insulated from each other.

7. An alternating current electromagnetic apparatus according to claim 1, said controlling coil and said exciting coil are wound insulated from each other, and in the neighbourhood of each other, in an up-and down-relation to each other.

8. An alternating current electromagnetic apparatus according to claim 1, wherein a controlling element to control the operation of said movable iron core is provided on one of said controlling winding and said exciting coil.

9. An alternating current electromagnetic apparatus according to claim 8, wherein a switch for controlling the operation of said movable iron core is connected across the terminals of said controlling coil.

10. An alternating current electromagnetic apparatus according to claim 8, wherein a thermosensitive resistance for controlling the operation of said movable iron core is connected across the terminals of said controlling coil.

11. An alternating current electromagnetic apparatus according to claim 8, wherein a photosensitive resistance for controlling the operation of said movable iron core is connected across the terminals of said controlling coil.

12. An alternating current electromagnetic apparatus according to claim 8, wherein a rectifier is connected to the controlling element for controlling the operation of said movable iron core connected to said controlling coil.

13. An alternating current electromagnetic apparatus according to claim 8, wherein a resistance element is inserted between said exciting coil and said alternating power source.

14. An alternating current electromagnetic apparatus according to claim 8, wherein a condenser element is inserted between said exciting coil and said alternating power source.

15. An alternating current electromagnetic apparatus according to claim 8, wherein an inductance element is inserted between said exciting coil and said alternating power source.

References Cited

UNITED STATES PATENTS

| | | | |
|---|---|---|---|
| 2,196,883 | 4/1940 | Winter | 317—155.5 XR |
| 2,509,835 | 5/1950 | Moore | 335—243 XR |
| 2,806,183 | 9/1957 | Gimson et al. | 317—156 XR |
| 3,154,723 | 10/1964 | Griffes | 317—155.5 XR |
| 3,161,806 | 12/1964 | Gordon | 317—156 XR |
| 3,280,375 | 10/1966 | Jensen | 323—90 XR |

FOREIGN PATENTS

| | | |
|---|---|---|
| 172,574 | 9/1952 | Austria. |
| 841,866 | 7/1960 | Great Britain. |

LEE T. HIX, Primary Examiner

W. M. SHOOP, JR., Assistant Examiner

U.S. Cl. X.R.

317—156; 335—243